United States Patent
Noda et al.

(10) Patent No.: US 10,501,077 B2
(45) Date of Patent: Dec. 10, 2019

(54) INTER-VEHICLE DISTANCE ESTIMATION METHOD AND INTER-VEHICLE DISTANCE ESTIMATION DEVICE

(71) Applicant: Nissan Motor Co., Ltd., Yokohama-shi, Kanagawa (JP)

(72) Inventors: Kuniaki Noda, Kanagawa (JP); Fang Fang, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/307,278

(22) PCT Filed: Jun. 14, 2016

(86) PCT No.: PCT/JP2016/067609
§ 371 (c)(1),
(2) Date: Dec. 5, 2018

(87) PCT Pub. No.: WO2017/216856
PCT Pub. Date: Dec. 21, 2017

(65) Prior Publication Data
US 2019/0276021 A1 Sep. 12, 2019

(51) Int. Cl.
*B60W 30/16* (2012.01)
*B60W 30/10* (2006.01)
*B60T 8/58* (2006.01)
*G08G 1/16* (2006.01)

(52) U.S. Cl.
CPC ......... *B60W 30/16* (2013.01); *B60W 2420/42* (2013.01); *B60W 2550/302* (2013.01); *B60W 2550/306* (2013.01)

(58) Field of Classification Search
CPC ...... B60W 30/00; B60W 30/10; B60W 30/16; B60W 2420/52; B60W 2550/10; B60T 2201/02; B60T 2201/08; B60T 2201/081; B60T 8/58; G08G 1/16; G08G 1/167
See application file for complete search history.

(56) References Cited

U.S. PATENT DOCUMENTS

| | | | |
|---|---|---|---|
| 8,571,742 B2 | 10/2013 | Takeoka | |
| 9,558,659 B1* | 1/2017 | Silver | ................ G08G 1/0125 |
| 10,156,851 B1* | 12/2018 | Silver | ................ G08G 1/0125 |
| 2005/0125125 A1* | 6/2005 | Matsumoto | ............ G08G 1/167 |
| | | | 701/41 |
| 2008/0002857 A1 | 1/2008 | Tsunashima | |

(Continued)

FOREIGN PATENT DOCUMENTS

| JP | 2007334631 A | 12/2007 |
|---|---|---|
| JP | 201072836 A | 4/2010 |

(Continued)

*Primary Examiner* — Yonel Beaulieu
(74) *Attorney, Agent, or Firm* — Young Basile Hanlon & MacFarlane, P.C.

(57) ABSTRACT

An inter-vehicle distance estimation method includes: estimating a screened area screened by an obstacle from a sensor and two unscreened areas sandwiching the screened area; and, based on speeds of two tracked vehicles traveling in a same traffic lane respectively within the two unscreened areas, estimating the inter-vehicle distances from the two tracked vehicles to a tracked vehicle traveling in the same traffic lane within the screened area.

5 Claims, 9 Drawing Sheets

(56) References Cited

U.S. PATENT DOCUMENTS

| | | | | |
|---|---|---|---|---|
| 2011/0082620 A1* | 4/2011 | Small | ............... | B60K 35/00 |
| | | | | 701/31.4 |
| 2015/0166062 A1* | 6/2015 | Johnson | ............ | B60W 30/12 |
| | | | | 701/41 |
| 2018/0093676 A1* | 4/2018 | Emura | ............ | G06K 9/00288 |
| 2018/0118223 A1* | 5/2018 | Mori | ............... | B60W 40/09 |
| 2018/0215380 A1* | 8/2018 | Devi | ............... | B60W 30/143 |
| 2019/0193727 A1* | 6/2019 | Noda | ............... | G08G 1/166 |
| 2019/0213886 A1* | 7/2019 | Noda | ............... | G01C 21/26 |

FOREIGN PATENT DOCUMENTS

| | | |
|---|---|---|
| JP | 2012080221 A | 4/2012 |
| JP | 2012191354 A | 10/2012 |
| JP | 2014203349 A | 10/2014 |

\* cited by examiner

| ID | SCREENED | POSITION [m] | SPEED [km/h] |
|---|---|---|---|
| 1 | NO | 90 | 40 |
| 2 | YES | (70) | (43.3) |
| 3 | YES | (40) | (48.3) |
| 4 | NO | 30 | 50 |
| 5 | YES | (20) | (45) |
| 6 | NO | 0 | 35 |

INTER-VEHICLE DISTANCE ESTIMATION METHOD AND INTER-VEHICLE DISTANCE ESTIMATION DEVICE

TECHNICAL FIELD

The present invention relates to an inter-vehicle distance estimation method of and an inter-vehicle distance estimation device for estimating an inter-vehicle distance.

BACKGROUND

Japanese Patent Application Publication No. 2012-80221 discloses a target tracking device that, in a case where a tracking target is screened by a plurality of screening objects, sets, as an object to be tracked, the one of the screening objects with the longest estimated screening duration calculated based on the difference between the motion vector of the screening object and the motion vector of the tracking target.

However, in the technique described in Japanese Patent Application Publication No. 2012-80221, the speed of the tracking target at the point when the tracking target was screened is used as its speed. For this reason, in a case of using the technique described in Japanese Patent Application Publication No. 2012-80221 to estimate the inter-vehicle distances in a line of vehicles including a tracking target, a change in the speed of the tracking target may possibly decrease the accuracy of the inter-vehicle distance estimation.

SUMMARY

In view of the above problem, an object of the present invention is to provide an inter-vehicle distance estimation method and an inter-vehicle distance estimation device that can improve the accuracy of inter-vehicle distance estimation.

An inter-vehicle distance estimation method according to one aspect of the present invention includes: estimating a screened area screened by an obstacle from a sensor and two unscreened areas sandwiching the screened area; and, based on speeds of two tracked vehicles traveling in a same traffic lane respectively within the two unscreened areas, estimating the inter-vehicle distances from the two tracked vehicles to a tracked vehicle traveling in the same traffic lane within the screened area.

According to the one aspect of the present invention, it is possible to provide an inter-vehicle distance estimation method and an inter-vehicle distance estimation device that can improve the accuracy of inter-vehicle distance estimation.

DETAILED DESCRIPTION

An embodiment of the present invention will be described with reference to the drawings. In the description of the drawings, the same or similar parts are denoted by the same or similar reference signs and overlapping description is omitted.

(Inter-Vehicle Distance Estimation Device)

Figure 1:
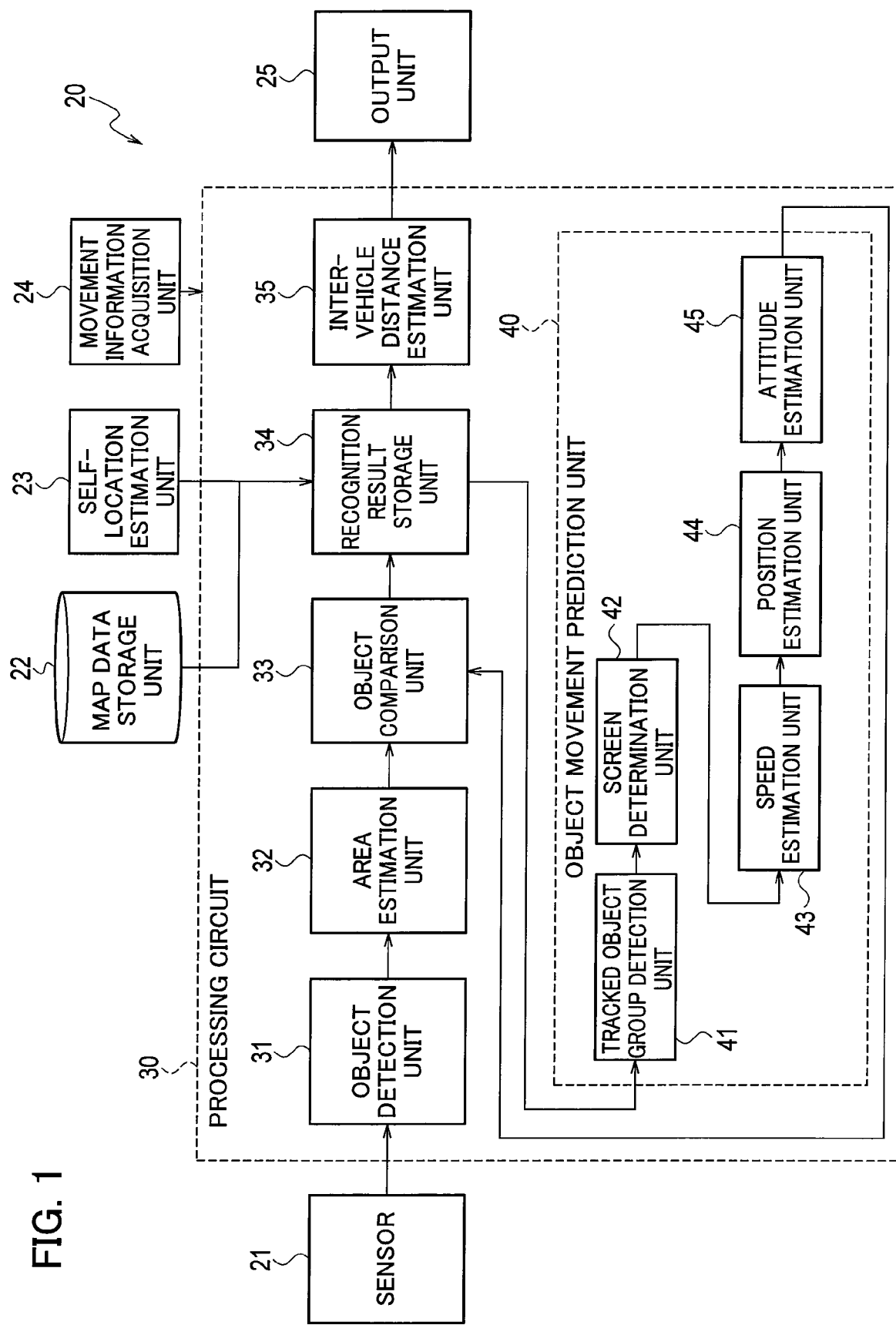
FIG. 1 is a schematic block diagram explaining the basic configuration of an inter-vehicle distance estimation device according to an embodiment of the present invention.
Figure 2:
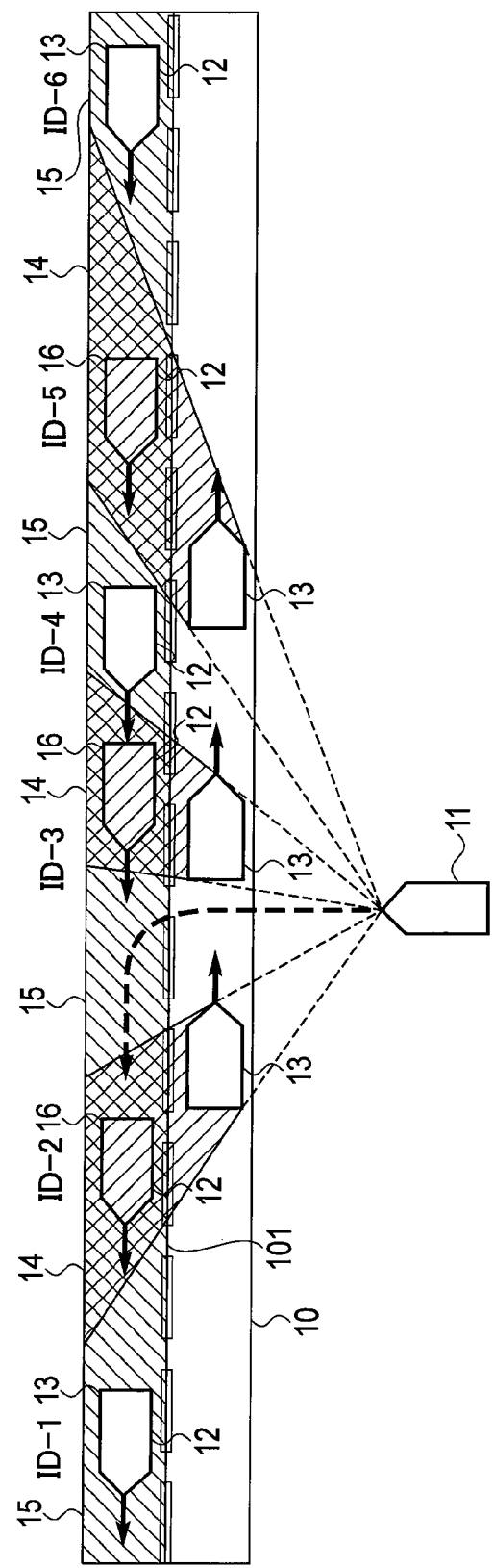
FIG. 2 is a diagram explaining a situation where a vehicle on which the inter-vehicle distance estimation device according to the embodiment of the present invention is mounted is about to merge into a far-side traffic lane.

FIG. 1 is a block diagram illustrating the configuration of an inter-vehicle distance estimation device 20 according to this embodiment. The inter-vehicle distance estimation device 20 includes a sensor 21, a map data storage unit 22, a self-location estimation unit 23, a movement information acquisition unit 24, an output unit 25, and a processing circuit 30. As illustrated in FIG. 2, the inter-vehicle distance estimation device 20 is, for example, mounted on a vehicle 11 (host vehicle) and estimates the inter-vehicle distances in a line of vehicles including other vehicles screened by obstacles.

The sensor 21 is mounted on the vehicle 11, and detects positional information of objects around the vehicle 11 and outputs it to the processing circuit 30. As the sensor 21, it is possible to employ a ranging sensor or an image sensor such as a laser rangefinder (LRF), a millimeter wave radar, an ultrasonic sensor, or a stereo camera, for example. The sensor 21 may be configured of a plurality of types of sensors and configured to detect the speeds, accelerations, shapes, colors, and so on of objects in the surrounding area. For example, the sensor 21 scans a predetermined range around the vehicle 11 to acquire three-dimensional distance data of the surrounding environment. The three-dimensional distance data is point group data indicating three-dimensional positions relative to the sensor 21.

The map data storage unit 22 is a storage device storing high-definition map data. The map data storage unit 22 may be mounted on the vehicle 11 or installed in a server or the like connected to a communication line. In the map data, general map information of roads, intersections, bridges, tunnels, and the like can be recorded, and also information on road structures such as the positions of traffic lanes and the classification of traffic zones and information on the locations, shapes, and so on of landmarks around roads can be recorded.

The self-location estimation unit 23 estimates the self-location of the vehicle 11 in the map data stored in the map data storage unit 22. The self-location includes the attitude of the vehicle 11. The self-location estimation unit 23 estimates the self-location based on information acquired from a positioning device such as a Global Positioning System (GPS) receiver and an acceleration sensor, an angular speed sensor, a steering angle sensor, a speed sensor, and the like mounted on the vehicle 11. The self-location estimation unit 23 may estimate a specific self-location in the map data by calculating the position of the vehicle 11 relative to landmarks recorded in the map data from the information acquired by the sensor 21.

The movement information acquisition unit 24 acquires movement information indicating states of movement of the vehicle 11 such as its speed, acceleration, angular speed, steering angle, and the like. The movement information is acquired from the speed sensor, the acceleration sensor, the angular speed sensor, the steering angle sensor, and the like mounted on the vehicle 11.

The output unit 25 is an output interface (I/F) that outputs the result of computation by the processing circuit 30. For example, the output unit 25 outputs the result of the computation by the processing circuit 30 to a control circuit that automatically controls drive of the vehicle 11. The output destination to which the output unit 25 outputs the computation result may be a display device, a speaker, or the like for presenting information to an occupant of the vehicle 11.

The processing circuit 30 has an object detection unit 31, an area estimation unit 32, an object comparison unit 33, a recognition result storage unit 34, an inter-vehicle distance estimation unit 35, and an object movement prediction unit 40. The processing circuit 30 includes a programmed processing device such as a processing device including an electric circuit. Besides this, the processing circuit can include a device such as an application specific integrated circuit (ASIC) or circuit components arranged to execute functions to be described. The processing circuit 30 can be configured of one or more processing circuits. The processing circuit 30 may be used also as an electronic control unit (ECU) used for other types of control for the vehicle 11.

The object detection unit 31 detects observable objects 13 around the vehicle 11 based on the information acquired by the sensor 21. The observable objects 13 are objects that are not screened by obstacles from the sensor 21 and are observable with the sensor 21. The object detection unit 31 acquires attribute information of each observable object 13 based on the information acquired by the sensor 21, the map data stored in the map data storage unit 22, the self-location estimated by the self-location estimation unit 23, and the movement information acquired by the movement information acquisition unit 24. The attribute information can include the position, speed, acceleration, attitude, shape, color, and type of the observable object 13. Note that the speed and acceleration of the observable object 13 can include information on the direction of turning. The object detection unit 31 sets an identifier (ID) for each detected observable object 13 and determines the attribute information and ID of the observable object 13 as object information of the observable object 13.

The area estimation unit 32 estimates screened areas 14 screened by obstacles from the sensor 21 and unscreened areas 15 not screened from the sensor 21 around the vehicle 11. The obstacles are observable objects 13. For example, the area estimation unit 32 determines the boundaries between the screened areas 14 and the unscreened areas 15 by extracting, from the point group data acquired by the sensor 21, pieces of point group data within a range covering a predetermined height from the ground surface and connecting the extracted pieces of point group data. The area estimation unit 32 estimates the far side of each determined boundary as a screened area 14 and the near side of each determined boundary as an unscreened area 15. The area estimation unit 32 estimates the areas sandwiching a screened area 14 in the horizontal direction as two unscreened areas 15.

The object comparison unit 33 compares each observable object 13 detected by the object detection unit 31 and a predicted object predicted by the object movement prediction unit 40 with each other and determines whether or not the observable object 13 and the predicted object correspond to each other. The object comparison unit 33 determines whether or not the observable object 13 and the predicted object correspond to each other based on the similarity between the attribute information of the observable object 13 and the attribute information of the predicted object.

Based on the self-location estimated by the self-location estimation unit 23 and the movement information acquired by the movement information acquisition unit 24, the recognition result storage unit 34 stores the object information acquired from the object detection unit 31 in association with the map data stored in the map data storage unit 22 as a recognition result. The recognition result storage unit 34 maps the object information determined by the object detection unit 31 onto the map data. The recognition result storage unit 34 updates the object information determined by the object detection unit 31 in accordance with the result of the determination by the object comparison unit 33. The recognition result storage unit 34 holds the IDs in certain pieces of the stored object information in accordance with the result of the determination by the object comparison unit 33 to thereby track each tracked vehicle 12 traveling in a screened area 14 or unscreened area 15.

Based on the self-location estimated by the self-location estimation unit 23 and the movement information acquired by the movement information acquisition unit 24, the recognition result storage unit 34 sets the screened areas 14 and the unscreened areas 15 estimated by the area estimation unit 32 in the same traffic lane recorded in the map data. The recognition result storage unit 34 stores the screened areas 14 and the unscreened areas 15 set in the same traffic lane in association with each other. Based on the map data, the recognition result storage unit 34 estimates an area in the traffic lane in which the screened areas 14 and the unscreened areas 15 associated with each other have been estimated to be, as a travel area 101 in which the tracked vehicles 12, or tracking targets, travel.

The inter-vehicle distance estimation unit 35 estimates the inter-vehicle distances between the plurality of tracked vehicles 12 traveling in the same travel area 101, based on the object information stored in the recognition result storage unit 34. The inter-vehicle distance estimation unit 35 estimates the inter-vehicle distances between the plurality of tracked vehicles 12 based on estimated speeds of the tracked vehicles 12 traveling in the screened area 14.

The object movement prediction unit 40 has a tracked object group detection unit 41, a screen determination unit 42, a speed estimation unit 43, a position estimation unit 44, and an attitude estimation unit 45. The object movement prediction unit 40 predicts the attribute information of the observable objects 13 and the unobserved objects 16 based on the object information of the observable objects 13. The object movement prediction unit 40 outputs the predicted attribute information and the ID of each of the observable objects 13 and the unobserved objects 16 as the object information of a predicted object.

Based on the recognition result in the recognition result storage unit 34, the tracked object group detection unit 41 detects a group of objects being present in the screened areas 14 and the unscreened areas 15 and having the same direction of movement as the plurality of tracked vehicles 12. The tracked object group detection unit 41 may detect a group of objects present in the travel area 101, estimated by the recognition result storage unit 34, as the plurality of tracked vehicles 12. Alternatively, the tracked object group detection unit 41 may detect observable objects 13 moving in any unscreened areas 15 in the direction of travel of a plurality of already detected tracked vehicles 12 as the tracked vehicles 12.

For each object in the group of objects detected by the tracked object group detection unit 41, the screen determination unit 42 determines whether or not the object is screened by another obstacle from the sensor 21. Specifically, the screen determination unit 42 determines whether the each object is present in any one of a screened area 14 and an unscreened area 15. An object determined by the screen determination unit 42 as not being screened is an observable object 13, whereas an object determined by the screen determination unit 42 as being screened is an unobserved object 16.

The speed estimation unit 43 estimates the speeds of the plurality of tracked vehicles 12 detected by the tracked object group detection unit 41. The speed estimation unit 43 estimates the current speed of an unobserved object 16 present in a screened area 14 based on the current speeds of the two observable objects 13 moving respectively in the two unscreened areas 15 sandwiching the screened area 14 in which the unobserved object 16 is present.

Based on the speeds estimated by the speed estimation unit 43 and the attribute information of the observable objects 13, the position estimation unit 44 estimates the current positions of the tracked vehicles 12.

Based on the speeds estimated by the speed estimation unit 43 and the attribute information of the observable objects 13, the attitude estimation unit 45 estimates the current attitudes of the tracked vehicles 12. The attitude estimation unit 45 may estimate the attitudes of the tracked vehicles 12 based on the shape of the road recorded in the map data.

(Inter-Vehicle Distance Estimation Method)

Figure 3A:
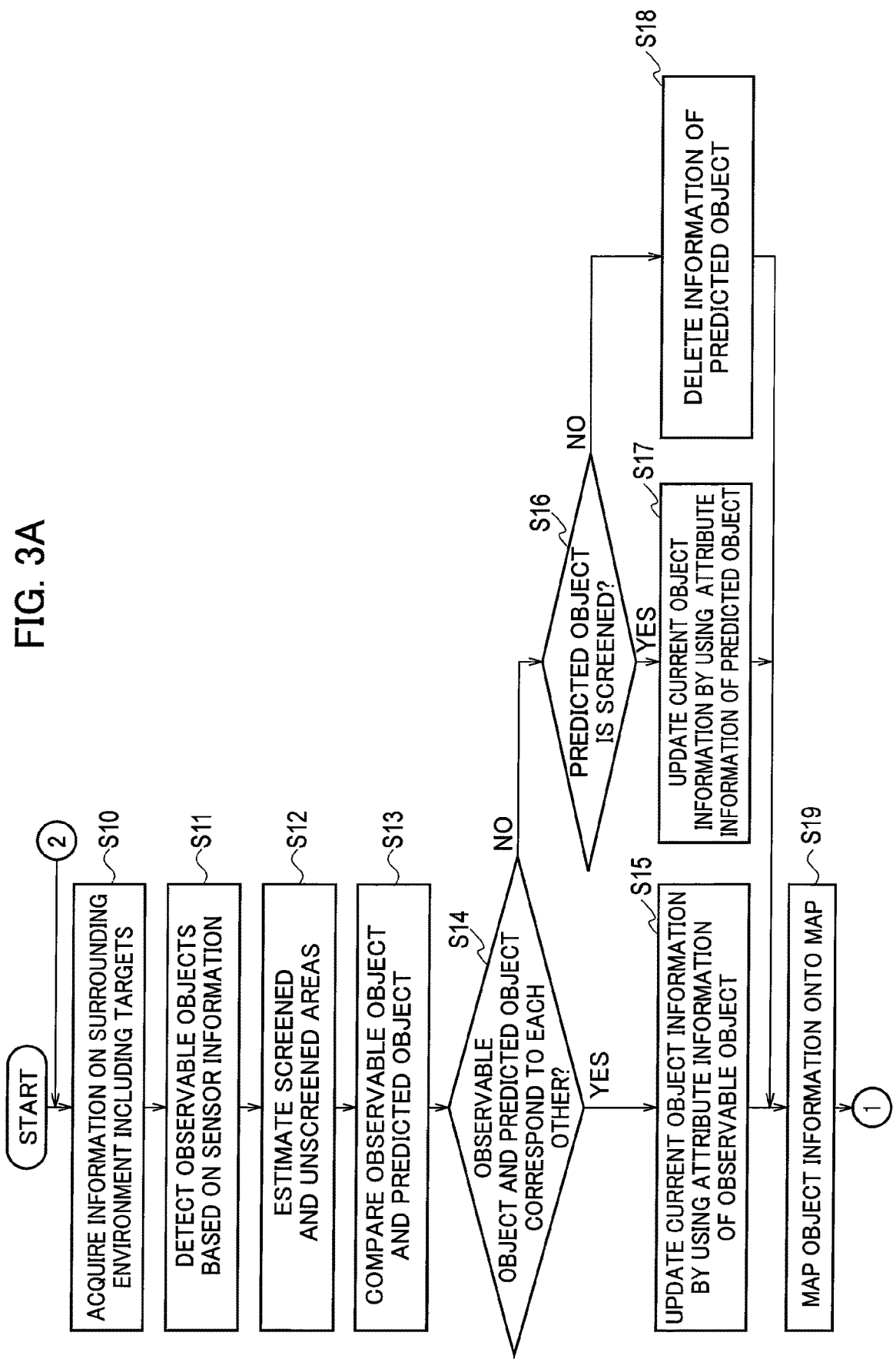
FIG. 3A is a flowchart explaining an example of the inter-vehicle distance estimation method by the inter-vehicle distance estimation device according to the embodiment of the present invention.
Figure 3B:
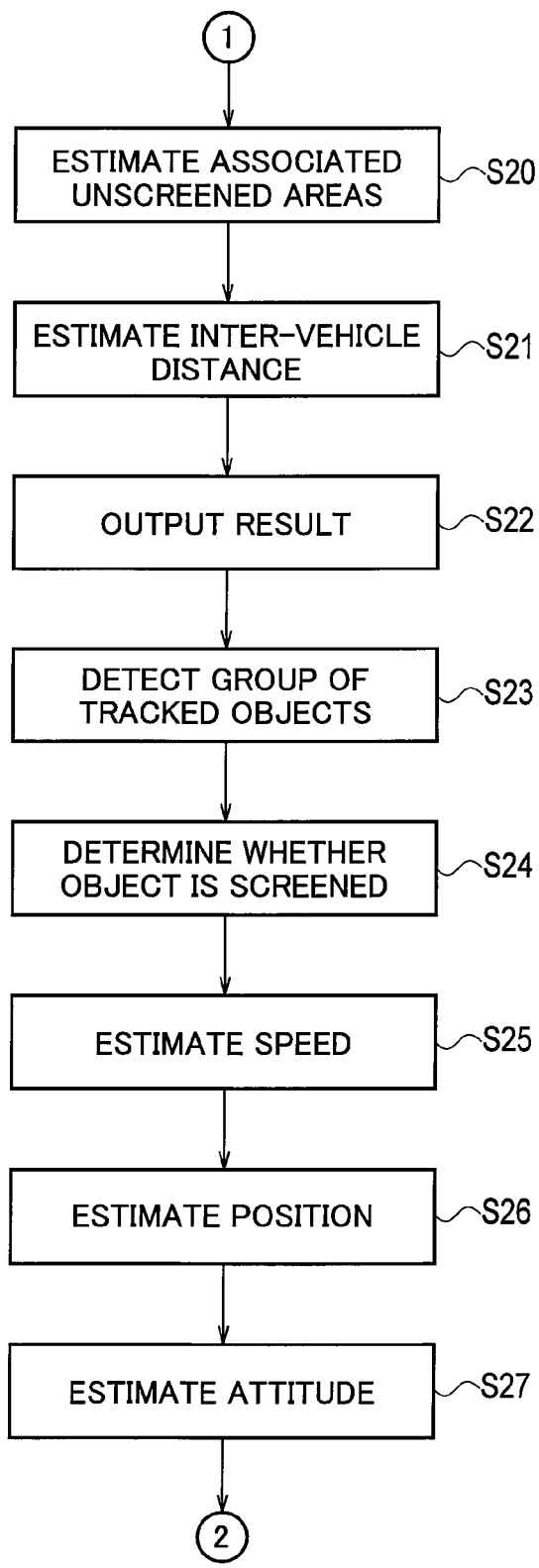
FIG. 3B is a flowchart explaining the example of the inter-vehicle distance estimation method by the inter-vehicle distance estimation device according to the embodiment of the present invention.

Now, an example of the inter-vehicle distance estimation method by the inter-vehicle distance estimation device 20 will be described using flowcharts in FIGS. 3A to 3B. The series of processes to be presented below is repetitively executed at predetermined times. The description will be exemplarily given of a situation where, as illustrated in FIG. 2, a road 10 is present ahead of the vehicle 11 with the inter-vehicle distance estimation device 20 mounted thereon, and the inter-vehicle distance estimation device 20 estimates the inter-vehicle distances between a plurality of tracked vehicles 12 traveling in the far-side traffic lane of the road 10 in order for the vehicle 11 to merge into the far-side traffic lane.

First, in step S10, the sensor 21 acquires information on the surrounding environment including the tracking targets (the plurality of tracked vehicles 12). In the example illustrated in FIG. 2, the sensor 21 acquires the positional information of at least objects ahead of the vehicle 11.

In step S11, the object detection unit 31 detects observable objects 13 and the object information of the observable objects 13 based on the information acquired in step S10. The object detection unit 31 may detect observable objects 13 including landmarks in the surrounding area and the object information of the observable objects 13 based on the map data, the self-location, and the movement information of the vehicle 11.

In step S12, the area estimation unit 32 estimates a plurality of screened areas 14 screened by obstacles from the sensor 21 and a plurality of unscreened areas 15 not screened from the sensor 21 based on the information acquired in step S10.

In step S13, the object comparison unit 33 compares the object information of each observable object 13 detected in step S11 and the object information of a predicted object predicted by the object movement prediction unit 40. Note that step S13 is under the assumption that the object information of the predicted object, acquired in steps S23 to S27 to be described later, has been input to the object comparison unit 33.

In step S14, the object comparison unit 33 determines whether or not the observable object 13 and its predicted object correspond to each other based on the similarity between the attribute information of the observable object 13 and the attribute information of the predicted object. If the object comparison unit 33 determines that they correspond to each other, the processing proceeds to step S15. If the object comparison unit 33 determines that they do not correspond to each other, the processing proceeds to step S16.

In step S15, the recognition result storage unit 34 updates the current object information of the observable object 13 by using its attribute information. Specifically, the recognition result storage unit 34 replaces the already stored attribute information in the object information of the observable object 13 with the attribute information at the current time acquired in step S11 and stores it as new object information of the observable object 13.

In step S16, the object comparison unit 33 determines whether or not the predicted object is screened. Specifically, based on the attribute information of the predicted object and the screened areas 14 estimated by the area estimation unit 32, the object comparison unit 33 determines whether or not the predicted object is present in a screened area 14. If the object comparison unit 33 determines that the predicted object is screened, the processing proceeds to step S17. If the object comparison unit 33 determines that the predicted object is not screened, the processing proceeds to step S18.

In step S17, the recognition result storage unit 34 updates the current object information by using the attribute information of the predicted object. Specifically, the recognition result storage unit 34 replaces the already stored attribute information in the object information of the observable object 13 with the attribute information of the predicted object at the current time input to the object comparison unit 33 and stores it as the object information of an unobserved object 16.

In step S18, the recognition result storage unit 34 deletes the object information of the predicted object at the current time input to the object comparison unit 33. Specifically, the recognition result storage unit 34 keeps the already stored object information of the observable object 13 without changing it. Note that if no predicted object's object information has been input or if any object information of the observable object 13 has never been stored before, then in step S18, the recognition result storage unit 34 stores the object information of the observable object 13 detected in step S11.

In step S19, the recognition result storage unit 34 maps the object information of the observable object 13 or the unobserved object 16 stored in one of steps S15 to S18 onto the map data. The recognition result storage unit 34 maps the object information of the observable object 13 or the unobserved object 16 onto the map data based on the map data, the self-location, and the movement information of the vehicle 11.

In step S20, the recognition result storage unit 34 estimates screened areas 14 and unscreened areas 15 associated with each other among the plurality of screened areas 14 and the plurality of unscreened areas 15 estimated in step S12, based on, for example, the map data, the self-location, and the movement information of the vehicle 11. For example, the recognition result storage unit 34 estimates a travel area 101 in the map data within an area covering a predetermined range in a lane where the plurality of screened areas 14 and the plurality of unscreened areas 15 have been estimated to be present. The recognition result storage unit 34 estimates the plurality of screened areas 14 and the plurality of unscreened areas 15 estimated to be presented in the same travel area 101, as the plurality of screened areas 14 and the plurality of unscreened areas 15 associated with each other. Meanwhile, the recognition result storage unit 34 may estimate the travel area 101 based on an area where a plurality of objects having the same direction of movement are detected, without using the map data.

In step S21, the inter-vehicle distance estimation unit 35 estimates the inter-vehicle distances between the plurality of tracked vehicles 12 traveling in the same travel area 101, estimated in step S20. The plurality of tracked vehicles 12 traveling in the same travel area 101 are formed of a plurality of observable objects 13 and a plurality of unobserved objects 16. Specifically, the inter-vehicle distance estimation unit 35 estimates the inter-vehicle distances between the plurality of tracked vehicles 12 based on the object information of the plurality of observable objects 13 and the plurality of unobserved objects 16 present in the travel area 101, estimated by the recognition result storage unit 34.

In step S22, the processing circuit 30 outputs the inter-vehicle distances between the plurality of tracked vehicles 12 estimated in step S21 to the output unit 25. Also, the processing circuit 30 outputs the object information of the plurality of observable objects 13 and the plurality of unobserved objects 16 and the information on the plurality of screened areas 14 and the plurality of unscreened areas 15 stored in the recognition result storage unit 34 to the output unit 25 as well.

In step S23, the tracked object group detection unit 41 detects a group of objects having the same direction of movement among the observable objects 13 and the unobserved objects 16 present in the plurality of screened areas 14 and the plurality of unscreened areas 15 associated with each other estimated in step S20, as a plurality of tracked vehicles 12. The tracked object group detection unit 41 may simply detect the group of objects present in the plurality of screened areas 14 and the plurality of the unscreened areas 15 associated with each other as the plurality of tracked vehicle 12.

In step S24, based on the object information of the group of objects detected in step S23, the screen determination unit 42 determines, for each object in the group of objects, whether or not the object is screened by an obstacle from the sensor 21. For example, the screen determination unit 42 determines whether or not the object is screened by referring to information contained in its attribute information and indicating whether or not the object is screened. In this case, in step S16, the object comparison unit 33 may just need to determine whether or not the predicted object is screened, and add the determination result to the attribute information. An object that is not screened is an observable object 13 whereas an object that is screened is an unobserved object 16.

In step S25, the speed estimation unit 43 estimates the speed of each unobserved object 16 determined as being screened in step S24, based on the attribute information of observable objects 13 determined as being not screened. Specifically, the speed estimation unit 43 estimates the speed of one or more unobserved objects 16, or one or more tracked vehicles 12 traveling in one screened area 14, based on the speeds of two observable objects 13, or two tracked vehicles 12 traveling respectively in the two unscreened areas 15 sandwiching this screened area 14.

Specific description will be given of a method of estimating the speeds of the unobserved objects 16 in a case where, as illustrated in FIG. 2, IDs 1 to 6 are set in the object information of the tracked vehicles 12 traveling in the plurality of screened areas 14 and a plurality of unscreened areas 15, for example. In the example illustrated in FIG. 2, the tracked vehicles 12 with the IDs 1, 4, and 6 are the observable objects 13, and the tracked vehicles 12 with the IDs 2, 3, and 5 are the unobserved objects 16.

Figures 4, 5:
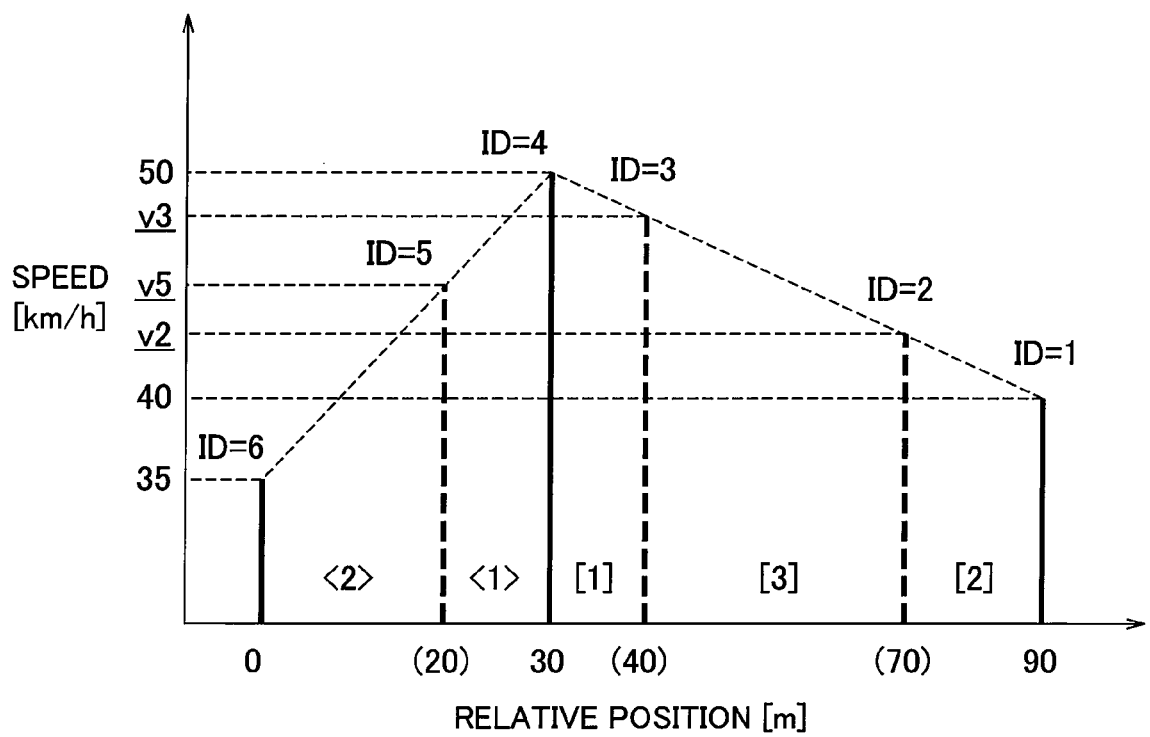
FIG. 4 is an example illustrating attribute information of a plurality of tracked vehicles.
FIG. 5 is a graph explaining a method of calculating estimated values listed in FIG. 4.

FIG. 4 is a table indicating whether or not the tracked vehicles 12 with the IDs 1 to 6 are screened, their positions, and their speeds at a given time. The position of each tracked vehicle 12 is, for example, a relative position based on the position of the tracked vehicle 12 with the ID 6 at the rear end of the detection range. The positions of the tracked vehicles 12 with the IDs 2, 3, and 5 are estimated from their speeds estimated at the previous time. Note that the numerical values in parenthesis mean estimated values.

FIG. 5 is a graph explaining the method of estimating the speeds of the unobserved objects 16 from the attribute information of the observable objects 13 listed in FIG. 4. The positions of the observable objects 13, or the tracked vehicles 12 with the IDs 1, 4, and 6, are 90 m, 30 m, and 0 m, respectively. The positions of the unobserved objects 16, or the tracked vehicles 12 with the IDs 2, 3, and 5, estimated at the previous time are 70 m, 40 m, and 20 m, respectively. The ratio between the inter-vehicle distances between the tracked vehicles 12 with the IDs 1 to 4 is 2:3:1 (see the brackets in FIG. 5). The ratio between the inter-vehicle distances between the tracked vehicles 12 with the IDs 4 to 6 is 1:2 (see the angle brackets in FIG. 5).

The speed estimation unit 43 estimates, as the speed of each unobserved object 16, a value by internally dividing the speeds of the two observable objects 13 sandwiching the unobserved object 16 by the ratio of inter-object distance using the position of the unobserved object 16 estimated at the previous time. The speeds of the observable objects 13 with the IDs 1 and 4 are 40 km/h and 50 km/h, respectively. By internally dividing these two speeds by the ratio of inter-object distance, an estimated speed of the unobserved object 16 with the ID 2 or 3 is calculated.

Let v2 be the speed of the unobserved object 16 with the ID 2, let v3 be the speed of the unobserved object 16 with the ID 3, and let v5 be the speed of the unobserved object 16 with the ID 5. Then, v2, v3, and v5 can be expressed as equations (1) to (3), respectively.

$$v2 = 40 + 10 \times (2/6) = 43.3 \qquad (1)$$

$$v3 = 40 + 10 \times (5/6) = 48.3 \qquad (2)$$

$$v5 = 35 + 15 \times (2/3) = 45 \qquad (3)$$

In step S26, the position estimation unit 44 estimates the current positions of the unobserved objects 16 based on the speeds estimated in step S25 and the attribute information of the observable objects 13.

Specifically, the current position can be found by calculating the amount of change in the distance between the vehicles from their vehicle speeds estimated in the previous cycle and the cycle duration. For example, in a case where the processing duration from the previous cycle is 100 ms, the distance between the vehicles with the IDs 1 and 2 increases by 9.2 cm from 20 m (90 m–70 m (the positions in FIG. 5)) due to the difference between the above-mentioned vehicle speeds v1=40 km/h and v2=43.3 km/h. By performing computation in this manner in each processing cycle, it is possible to accurately estimate the inter-vehicle distance to a vehicle in a screened area.

In step S27, the attitude estimation unit 45 estimates the current attitudes of the unobserved objects 16 based on the speeds estimated in step S25 and the attribute information of the observable objects 13.

(Operation Example)

Figure 6A:
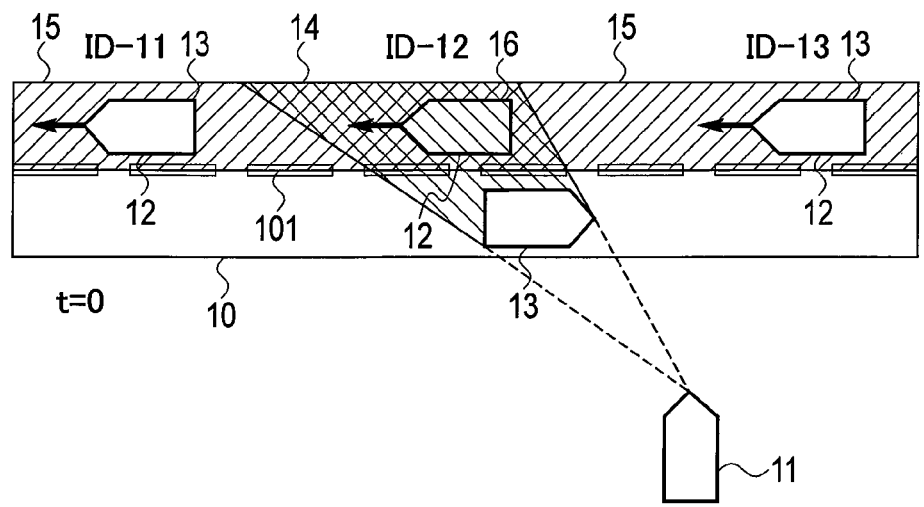
FIG. 6A is a diagram explaining a situation where a tracked vehicle in a screened area accelerates.
Figure 6B:
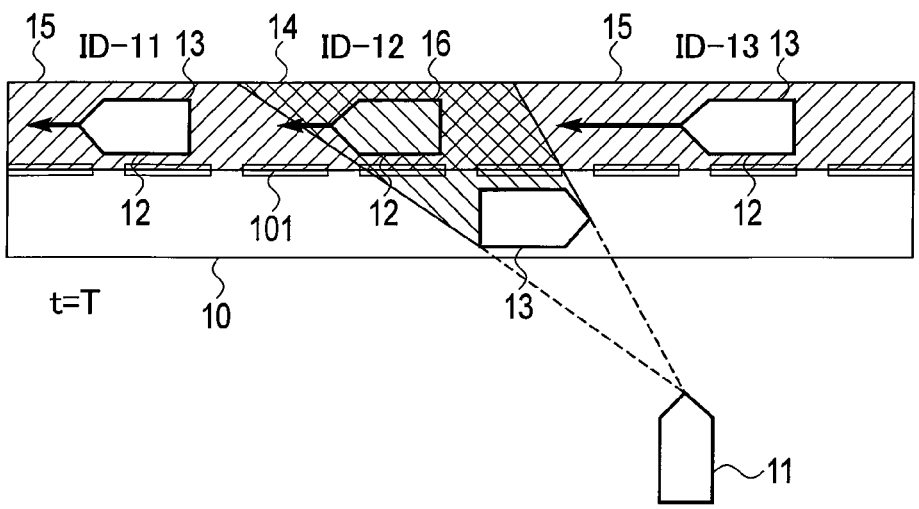
FIG. 6B is a diagram explaining the situation where the tracked vehicle in the screened area accelerates.

FIGS. 6A and 6B are diagrams explaining a situation where objects with IDs 11, 12, and 13 are travelling at the same speed at a time t=0 and, from this state, the one unobserved object 16 (ID=12), situated between the two observable objects 13 (ID=11, 13), accelerates from the time t=0 to a time t=T. In a case where the speed of the tracked vehicle 12 with the ID 13 relative to the tracked vehicle 12 with the ID 11 is observed to have increased, it is possible to estimate that the tracked vehicle 12 with the ID 12, or the unobserved object 16, has accelerated from the time t=0 to the time t=T. Consequently, the inter-vehicle distances between the three tracked vehicles 12 with the IDs 11 to 13 are each estimated to have decreased.

The vehicle speeds and the inter-vehicle distances from the time t=0 to the time t=T are computed and updated in S25 and S26 in each processing cycle. Hence, from the changes in the vehicle speeds of the two observable objects 13 (ID=11, 13), the inter-vehicle distances to the unobserved object 16 (ID=12) can be accurately estimated.

Figure 7:
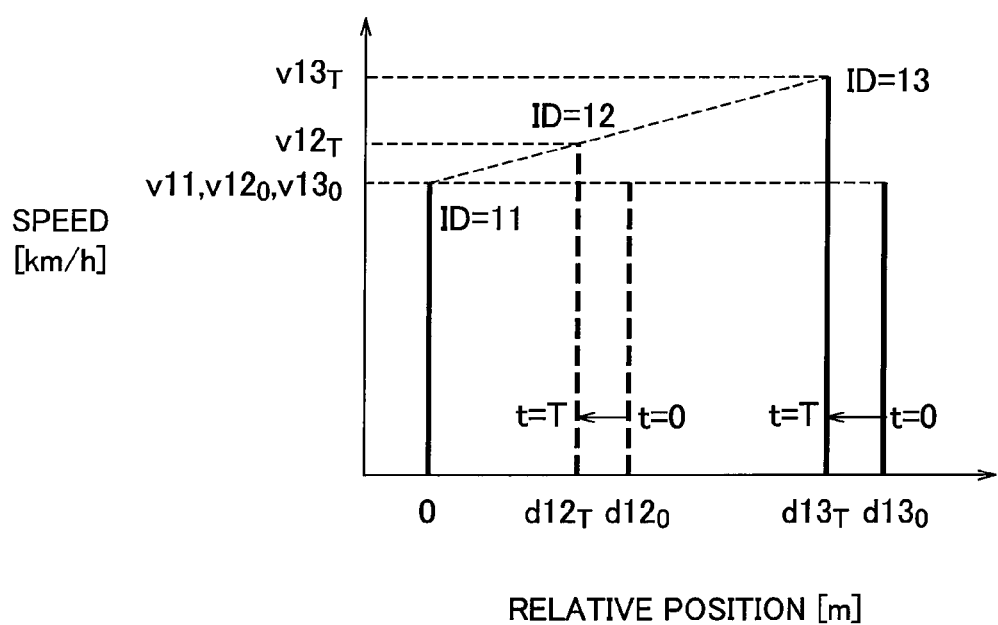
FIG. 7 is a graph illustrating the speeds and positions of a plurality of tracked vehicles.

As illustrated in FIG. 7, the speed of the tracked vehicle with the ID 11 at the time t=0 is v11. The position and speed of the tracked vehicle 12 with the ID 13 at the time t=0 are $d13_0$ and $v13_0$, respectively. Note that the position of each tracked vehicle 12 is a relative position based on the position of the tracked vehicle 12 with the ID 11. The position of the tracked vehicle 12 with the ID 12 estimated at the previous time is $d12_0$. In this case, the inter-vehicle distance estimation unit 35 calculates a speed $v12_0$ by internally dividing the speed v11 and the speed $v13_0$ by the ratio between the distance from 0 to $d12_0$ and the distance from $d12_0$ to $d13_0$, as an estimated speed of the unobserved object 16 at the time t=0. FIG. 7 illustrates a case where, at the time t=0, the tracked vehicles 12 with the IDs 11 and 13 are observed to be at the same speed and the tracked vehicle 12 with the ID 12 is estimated to be at the same speed as well.

Then, as a result of observation of the tracked vehicles 12 with the IDs 11 and 13 at the time t=T, the position and speed of the tracked vehicle 12 with the ID 13 are $d13_T$ and $v13_T$, respectively, and the position of the tracked vehicle 12 with the ID 12 estimated from the speed and position of the tracked vehicle 12 with the ID 12 at the previous time preceding the time t=T is $d12_T$. As described above, the vehicle speeds and the inter-vehicle distances from the time t=0 to the time t=T are computed and updated in S25 and S26 in each processing cycle.

In this case, the inter-vehicle distance estimation unit 35 calculates a speed $v12_T$ by internally dividing the speed v11 and the speed $v13_T$ by the ratio between the distance from 0 to $d12_T$ and the distance from $d12_T$ to $d13_T$, as an estimated speed of the unobserved object 16 at the time t=T.

As described above, by estimating the speed of the tracked vehicle 12 with the ID 12, or the unobserved object 16, in accordance with the acceleration of the tracked vehicle 12 with the ID 13, or an observable object 13, it is possible to improve the accuracy of estimation of the speed of the unobserved object 16. As a result, the positions of the plurality of tracked vehicles 12 in the next processing cycle are accurately estimated based on the estimated vehicle speed and the inter-vehicle distance estimation unit 35 can therefore accurately estimate the inter-vehicle distances.

Figure 8A:
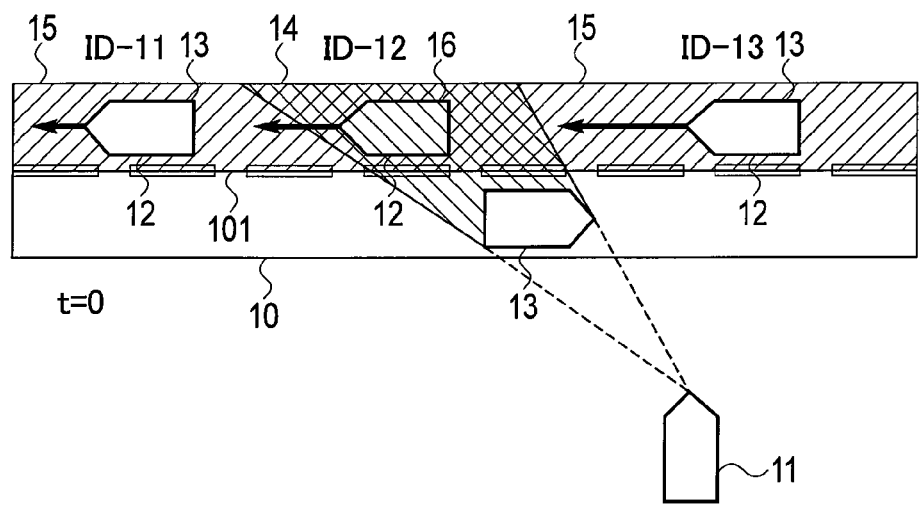
FIG. 8A is a diagram explaining a situation where a tracked vehicle in a screened area decelerates.
Figure 8B:
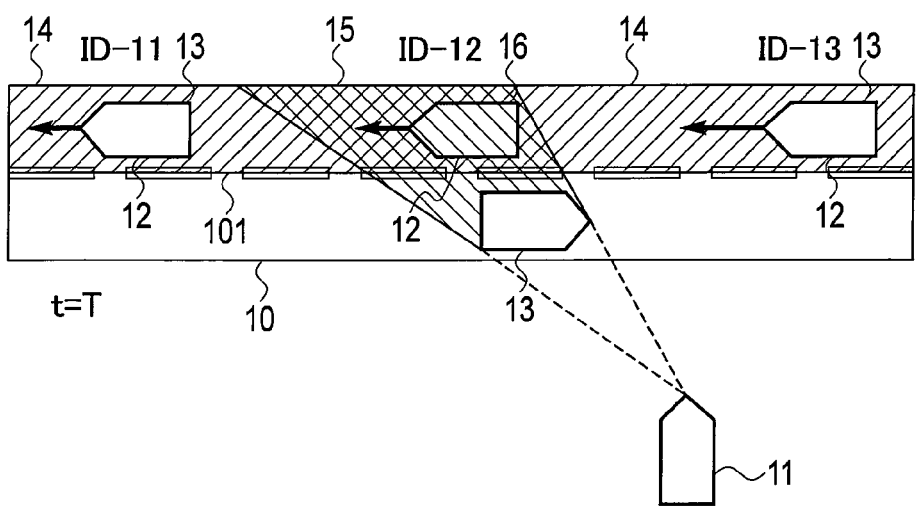
FIG. 8B is a diagram explaining the situation where the tracked vehicle in the screened area decelerates.

FIGS. 8A and 8B are diagrams explaining a situation where the one unobserved object 16 (ID=12), situated between the two observable objects 13 (ID=11, 13), decelerates from the time t=0 to the time t=T. In a case where the speed of the tracked vehicle 12 with the ID 13 relative to the tracked vehicle 12 with the ID 11 is observed to have decreased, it is possible to estimate that the tracked vehicle 12 with the ID 12, or the unobserved object 16, has decelerated from the time t=0 to the time t=T. Consequently, the inter-vehicle distances between the three tracked vehicles 12 with the IDs 11 to 13 are each estimated to have increased.

Figure 9:
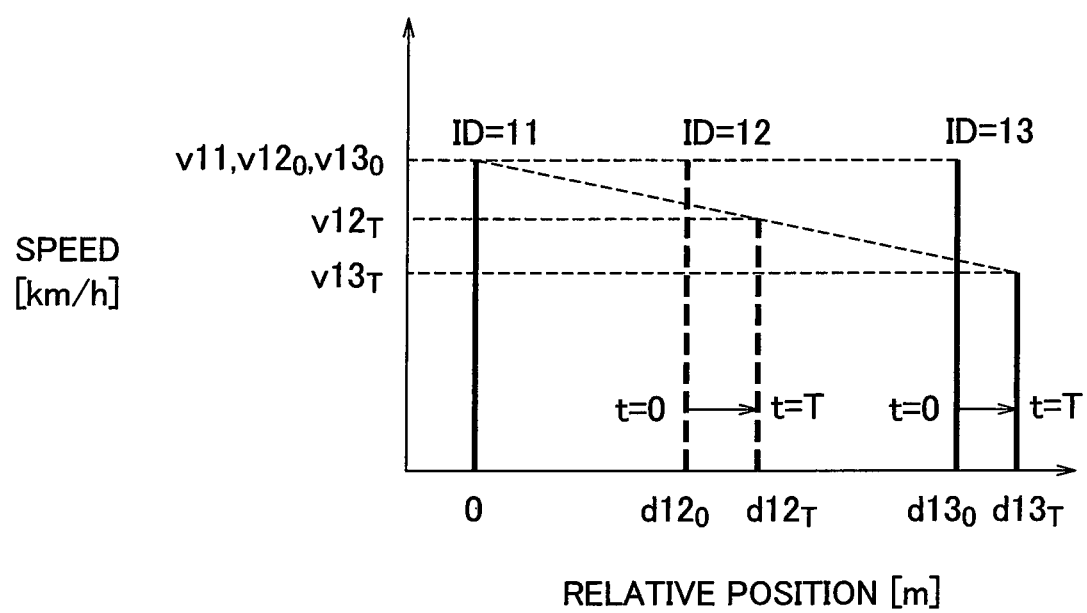
FIG. 9 is a graph illustrating the speeds and positions of a plurality of tracked vehicles.

As illustrated in FIG. 9, the inter-vehicle distance estimation unit 35 calculates the speed $v_0$ by internally dividing the speed v11 and the speed $v13_0$ by the ratio between the distance from 0 to $d12_0$ and the distance from $d12_0$ to $d13_0$, as an estimated speed of the unobserved object 16 at the time t=0. FIG. 9 illustrates a case where, at the time t=0, the tracked vehicles 12 with the IDs 11 and 13 are observed to be at the same speed and the tracked vehicle 12 with the ID 12 is estimated to be at the same speed as well. Similarly, the inter-vehicle distance estimation unit 35 calculates the speed $v12_T$ by internally dividing the speed v11 and the speed $v13_T$ by the ratio between the distance from 0 to $d12_T$ and the distance from $d12_T$ to $d13_T$, as an estimated speed of the unobserved object 16 at the time t=T.

As described above, by estimating the speed of the tracked vehicle 12 with the ID 12, or the unobserved object 16, in accordance with the deceleration of the tracked vehicle 12 with the ID 13, or an observable object 13, it is possible to improve the accuracy of estimation of the speed of the unobserved object 16. As a result, the positions of the plurality of tracked vehicles 12 in the next processing cycle are accurately estimated based on the estimated vehicle speed and the inter-vehicle distance estimation unit 35 can therefore accurately estimate the inter-vehicle distances.

Based on the speeds of vehicles traveling in the same traffic lane in two unscreened areas 15 sandwiching a screened area 14, the inter-vehicle distance estimation device 20 according to this embodiment estimates their inter-vehicle distances to a vehicle traveling in the same traffic lane in the screened area 14. In short, based on the current speeds of two observable objects 13 sandwiching an unobserved object 16, the inter-vehicle distance estimation device 20 estimates their current inter-vehicle distances to the unobserved object 16. In this way, the inter-vehicle distance estimation device 20 can accurately estimate the inter-vehicle distances to the unobserved object 16.

Also, the inter-vehicle distance estimation device 20 estimates the speed of the vehicle traveling in the same lane in the screened area 14. Specifically, the inter-vehicle distance estimation device 20 estimates the current speed of an unobserved object 16 based on the current speeds of two observable objects 13 sandwiching the unobserved object 16. In this way, the inter-vehicle distance estimation device 20 can accurately estimate the speed of the unobserved object 16 and consequently improve the accuracy of inter-vehicle distance estimation.

Also, the inter-vehicle distance estimation device 20 estimates the travel area 101, in which a plurality of tracked vehicles 12 travel, by using map data and estimates a plurality of unscreened areas 15 in the travel area 101. In this way, the inter-vehicle distance estimation device 20 can accurately estimate the unscreened areas 15 and therefore effectively detect observable objects 13.

Also, the inter-vehicle distance estimation device 20 tracks each tracked vehicle 12 based on the similarity between the attribute information of an observable object 13 and the attribute information of a predicted object. The inter-vehicle distance estimation device 20 determines whether or not the observable object 13 and the predicted object correspond to each other. In particular, by employing the shape, color, and the like of the tracked vehicle 12 as its attribute information, even if the tracked vehicle 12 temporarily enters a screened area 14, the inter-vehicle distance estimation device 20 can accurately track the same tracked vehicle 12 when it enters an unscreened area 15 again.

(Other Embodiments)

Although the present invention has been described as above through the foregoing embodiment, it should not be understood that the statement and the drawings constituting part of this disclosure limit the present invention. Various alternative embodiments, examples, and operation techniques will become apparent to those skilled in the art from this disclosure.

For example, in the foregoing embodiment, the object comparison unit 33 may determine whether or not an observable object 13 and a predicted object correspond to each other by using their attitudes as their attribute information. In this way, the inter-vehicle distance estimation device 20 can track the same tracked vehicle 12 more accurately. Note that the attitude of each tracked vehicle 12 can be estimated based, for example, on portions bent in an L-shape in the point group data obtained by the sensor 21, the direction tangential to the history of movement, the shape of the road, and the like.

Besides the above, the present invention encompasses various embodiments and the like that are not described herein, such as configurations using the above-described components on each other, as a matter of course. Therefore, the technical scope of the present invention is determined solely by the matters specifying the invention according to the claims that are considered appropriate from the foregoing description.

REFERENCE SIGNS LIST 11 vehicle
12 tracked vehicle
14 screened area
15 unscreened area
20 inter-vehicle distance estimation device
21 sensor
30 processing circuit
101 travel area

The invention claimed is:

1. An inter-vehicle distance estimation method using a sensor that detects positional information of objects around a vehicle, and a processing circuit that estimates inter-vehicle distances between a plurality of tracked vehicles detected based on the positional information, comprising:
    causing the processing circuit to estimate a screened area screened by an obstacle from the sensor and two unscreened areas sandwiching the screened area; and
    causing the processing circuit to, based on speeds of two of the tracked vehicles traveling in a same traffic lane respectively within the two unscreened areas, estimate the inter-vehicle distances from the two tracked vehicles to one of the tracked vehicles traveling in the same traffic lane within the screened area.

2. The inter-vehicle distance estimation method according to claim 1, further comprising:
    causing the processing circuit to estimate a speed of the tracked vehicle traveling in the same traffic lane within the screened area; and
    causing the processing circuit to estimate the inter-vehicle distances based on the estimated speed of the tracked vehicle.

3. The inter-vehicle distance estimation method according to claim 1, further comprising:
    causing the processing circuit to estimate, in map data, a travel area in which the plurality of tracked vehicles travel; and
    causing the processing circuit to estimate the two unscreened areas within the travel area.

4. The inter-vehicle distance estimation method according to claim 1, further comprising:
    causing the sensor to detect at least either shapes or colors of the tracked vehicles; and
    causing the processing circuit to track the tracked vehicles based on the at least either the shapes or the colors of the tracked vehicles.

5. An inter-vehicle distance estimation device comprising:
    a sensor that detects positional information of objects around a vehicle; and
    a processing circuit that estimates inter-vehicle distances between a plurality of tracked vehicles detected based on the positional information,
    wherein the processing circuit estimates a screened area screened by an obstacle from the sensor and two unscreened areas sandwiching the screened area,
    based on speeds of two of the tracked vehicles traveling respectively within the two unscreened areas, the processing circuit estimates a speed of one of the tracked vehicles traveling within the screened area, and
    based on the estimated speed of the tracked vehicle, the processing circuit estimates the inter-vehicle distances between the plurality of tracked vehicles.

* * * * *